(12) United States Patent
Wu et al.

(10) Patent No.: US 9,094,613 B2
(45) Date of Patent: Jul. 28, 2015

(54) PHOTOGRAPHIC APPARATUS WITH SUPPLEMENTAL LIGHT ADJUSTING FUNCTION AND METHOD USED IN THE SAME

(71) Applicant: BenQ Corporation, Taipei (TW)

(72) Inventors: Ho-Shih Wu, Taipei (TW); Chen-Hung Lin, New Taipei (TW); Li-Wei Cheng, Taipei (TW); Ming-Chih Yuan, Taoyuan County (TW)

(73) Assignee: BenQ Corporation, Taipei (TW)

( * ) Notice: Subject to any disclaimer, the term of this patent is extended or adjusted under 35 U.S.C. 154(b) by 0 days.

(21) Appl. No.: 14/318,709

(22) Filed: Jun. 30, 2014

(65) Prior Publication Data
US 2015/0124123 A1    May 7, 2015

(30) Foreign Application Priority Data

Nov. 1, 2013 (TW) .............................. 102139841 A

(51) Int. Cl.
| | |
|---|---|
| G03B 15/05 | (2006.01) |
| H04N 5/222 | (2006.01) |
| H04N 5/235 | (2006.01) |
| H04N 5/238 | (2006.01) |
| H04N 5/232 | (2006.01) |

(52) U.S. Cl.
CPC ............ *H04N 5/2352* (2013.01); *H04N 5/238* (2013.01); *H04N 5/2354* (2013.01); *H04N 5/23219* (2013.01); *H04N 5/23293* (2013.01)

(58) Field of Classification Search
CPC .............. H04N 5/238; H04N 5/23219; H04N 5/23293; H04N 5/2354; G03B 12/05
USPC .......................... 396/157, 158, 164–166, 169
See application file for complete search history.

(56) References Cited

U.S. PATENT DOCUMENTS

| | | | |
|---|---|---|---|
| 7,991,281 B1* | 8/2011 | Majewicz et al. ............. | 396/164 |
| 8,233,788 B2* | 7/2012 | Sosa .............................. | 396/164 |
| 2003/0161621 A1* | 8/2003 | Takaiwa ........................ | 396/166 |
| 2005/0088570 A1* | 4/2005 | Seo ............................... | 348/371 |
| 2008/0009316 A1* | 1/2008 | Yamashita .................. | 455/556.1 |

* cited by examiner

*Primary Examiner* — William Perkey

(57) ABSTRACT

A photographic apparatus with supplemental light adjusting function and the supplemental light adjusting method used in the same are provided. The photographic apparatus comprises a light source and a photographic element. The method comprises steps of: photographing by the photographic element; illuminating by the light source once the operating condition of a default photographing mode is conformed, and reaching a first supplemental light intensity by the light source within a first length of time; completing photographing by the photographic element once the light source reaches a second supplemental light intensity which is greater than the first supplemental light intensity.

4 Claims, 4 Drawing Sheets

PHOTOGRAPHIC APPARATUS WITH SUPPLEMENTAL LIGHT ADJUSTING FUNCTION AND METHOD USED IN THE SAME

This application claims the benefit of Taiwan application Serial No. 102139841, filed Nov. 1, 2013, the subject matter of which is incorporated herein by reference.

FIELD OF THE INVENTION

The invention relates in general to a photographic apparatus with supplemental light adjusting function and a supplemental light adjusting method used in the same, and more particularly to an photographic apparatus which adopts two-stage illumination supplement to avoid generating visual impact on the photographer, and a corresponding adjusting method capable of determining suitable supplemental light according to the background luminance.

DESCRIPTION OF THE RELATED ART

Modern people normally photograph (such as take photos) with electronic devices such as digital cameras or smart phones. The electronic devices provide instant images for the user to check, and bring tremendous convenience and lots of funs to the user. Ordinary digital cameras or smart phones have many in-built scene modes which are implemented by image processing technology and provide more photographing choices for the user to obtain suitable or special photographing results.

According to the theory of photography, light is an essential factor. When the environment has adequate ambient light or background light, the user will find it easier to have quality photographing results. However, when the environment lacks adequate ambient light or is too dark, the user needs to use or turn on a relevant light source to supplement the light. Currently, digital cameras or smart phones most generally are equipped with an illumination unit (such as a flash light) for supplementing the light required in photographing. For example, the user may decide whether to turn on the flash light to supplement the light according to a pre-determined scene mode or operating condition of photographing.

In terms of current technology, the operation of relevant illumination units are mainly for supplementing the light and cannot avoid generating visual impact on the user or the photographed person. In greater details, the flash light is normally requested when the user is photographing in an environment which lacks adequate light. The user exposed in the environment when the flash light is turned on cannot adapt to the strong flash light and may feel uncomfortable with the eyes. Furthermore, some flash lights have a fixed luminance. If the user does not appropriately adjust the shutter (which controls the exposure time) or aperture (which controls the amount of light input) of the camera beforehand, the luminance of the photographing may become too large and spoil the photographing result (for example, the image is too white). This is commonly seen in short distance photographing (for example, when the user takes a selfie).

Referring to both FIG. 1A and FIG. 1B, diagrams of luminance vs time relationship under two turn-on modes of a conventional flash light are shown. As indicated in FIG. 1A, the flash light is instantly turned on to provide a high luminance, and from the time when the shutter is half pressed (time point t1) for the camera to perform focusing and metering to the time when the shutter is completely pressed (time point t2) to complete photographing, the user photographs with the same luminance L1. As indicated in FIG. 1B, the flash light is not turned on when the shutter is half pressed for the camera to perform focusing and metering (time point t1). When the shutter is completely pressed (time point t2) to confirm photographing, the flash light flickers (the flash light illuminates with a luminance L2 but is turned on and turned off several times within a short time to avoid the red-eye phenomenon) to illuminate and perform sync metering, and the flash light illuminates for a longer duration at the time point when metering is completed (time point t3) to supplement the light required for photographing.

The above two turn-on modes of conventional flash light cannot provide satisfactory results no matter in the visual adaption of the photographed person or in the photographing result. Therefore, how to resolve the above problems has become a prominent object of the invention.

SUMMARY OF THE INVENTION

The invention is directed to a photographic apparatus with supplemental light adjusting function and a supplemental light adjusting method used in the same. The photographic apparatus of the invention adopts two-stage illumination supplement to avoid generating visual impact on the photographer. Meanwhile, the invention determines suitable supplemental light according to the background luminance such that better effect of photographing can be achieved.

According to one embodiment of the present invention, a supplemental light adjusting method used in a photographic apparatus is provided. The photographic apparatus comprises a light source and a photographic element. The photographic element comprises a lens, a signal converter and other relevant elements which are generally known to those who are skilled in the technology field of the invention, wherein details of other relevant elements are not repeated here. The method comprises steps of: photographing by the photographic element; illuminating by the light source once the operating condition of a default photographing mode is conformed, and reaching a first supplemental light intensity by the light source within a first length of time; completing photographing by the photographic element once the light source reaches a second supplemental light intensity which is greater than the first supplemental light intensity.

According to another embodiment of the present invention, a photographic apparatus with supplemental light adjusting function is provided. The photographic apparatus with supplemental light adjusting function comprises a body, a light source and a photographic element. The light source disposed on the body is used for illumination and is adjustable between a first supplemental light intensity and a second supplemental light intensity greater than the first supplemental light intensity. The photographic element disposed on the body is used for photographing. Once the operating condition of a default photographing mode is conformed, the light source reaches the first supplemental light intensity within a first length of time. Once the light source reaches the second supplemental light intensity, the photographic element completes photographing.

The above and other aspects of the invention will become better understood with regard to the following detailed description of the preferred but non-limiting embodiment (s). The following description is made with reference to the accompanying drawings.

DETAILED DESCRIPTION OF THE INVENTION

Figure 1A:
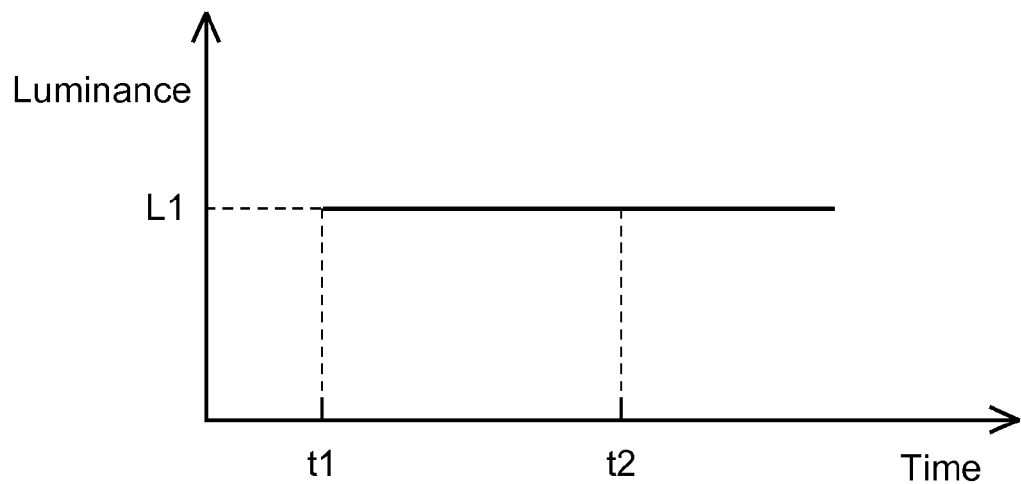
FIG. 1A and FIG. 1B (prior art) are diagrams of luminance vs time relationship under two turn-on modes of a conventional flash light.
Figure 1B:
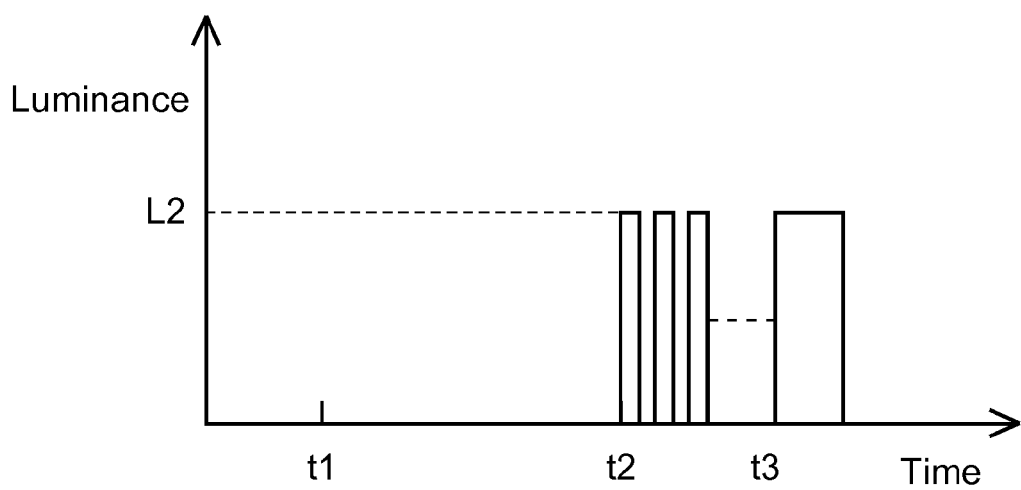
Figure 2:
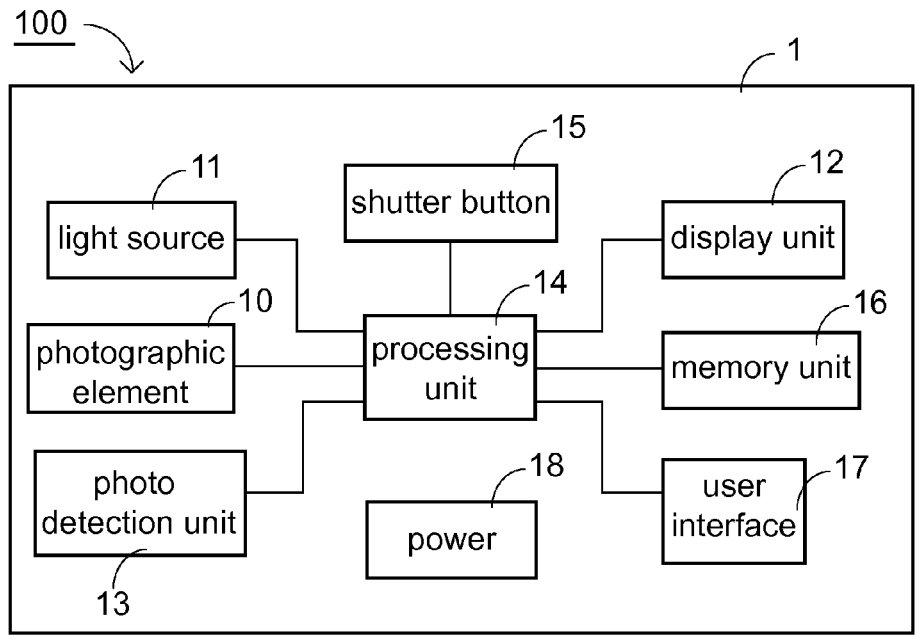
FIG. 2 is a functional block diagram of a photographic apparatus 100 of the invention.

The implementation of the invention is exemplified with an exemplary embodiment. In the exemplary embodiment, a photographic apparatus 100 with supplemental light adjusting function is provided. Referring to FIG. 2, a functional block diagram of a photographic apparatus 100 of the invention is shown. As indicated in FIG. 2, the photographic apparatus 100 comprises a photographic element 10 (comprising a lens, a signal converter and other relevant elements), a light source 11, a display unit 12, a photo detection unit 13, a processing unit 14, a shutter button 15, a memory unit 16, a user interface 17 and a power 18. In practical application, the photographic apparatus 100 can be realized by a digital camera, a smart phone, or other electronic device with photographic function. The design of relevant hardware elements of the photographic apparatus 100 of the invention can be identical to generally known technologies but the supplemental light adjusting function of the photographic apparatus 100 of the invention is configured on the photographic apparatus 100 by way of programming design and can be activated through corresponding operating condition.

In order to achieve the supplemental light adjusting function, the light source 11 can be formed by a light emitting material of light emitting diode (LED) such that the luminance intensity of the light source 11 can be controlled by adjusting the power output. For example, the luminance intensity is adjustable from activating illumination to reaching a supplemental light intensity or between a first supplemental light intensity and a second supplemental light intensity. The light source 11 can further comprise a filter (not illustrated in the diagram) for adjusting the light emitted from an interior of the light source 11, that is, for changing the color temperature of the emitted light and providing a supplemental light matching the skin color.

The appearance of the photographic apparatus 100 is composed of a body 1 (referring to FIGS. 4A and 4B), and each hardware element is disposed in or on the body 1 to provide respective function or for the user to operate. For example, the display unit 12 can be realized by a liquid crystal screen for displaying photographic state of the photographic element 10, and can have a touch function. The user interface 17 can be realized by a physical button or a function menu or function icon on the touch screen. FIG. 2 further illustrates electrical connection between hardware elements.

In the present embodiment, the supplemental light adjusting function can be designed as a physical button, a function menu or a function icon with which the user can select, set or activate the supplemental light adjusting function. In other words, the supplemental light adjusting function can co-exist with other photographic functions of an ordinary digital camera or smart phone. Before the supplemental light adjusting function of the invention is activated, the user can photograph with a conventional operation or corresponding function. According to the design of the invention, once the user selects or activates the supplemental light adjusting function, the illumination supplement of the light source 11 is an automatic processing procedure.

Figure 3:
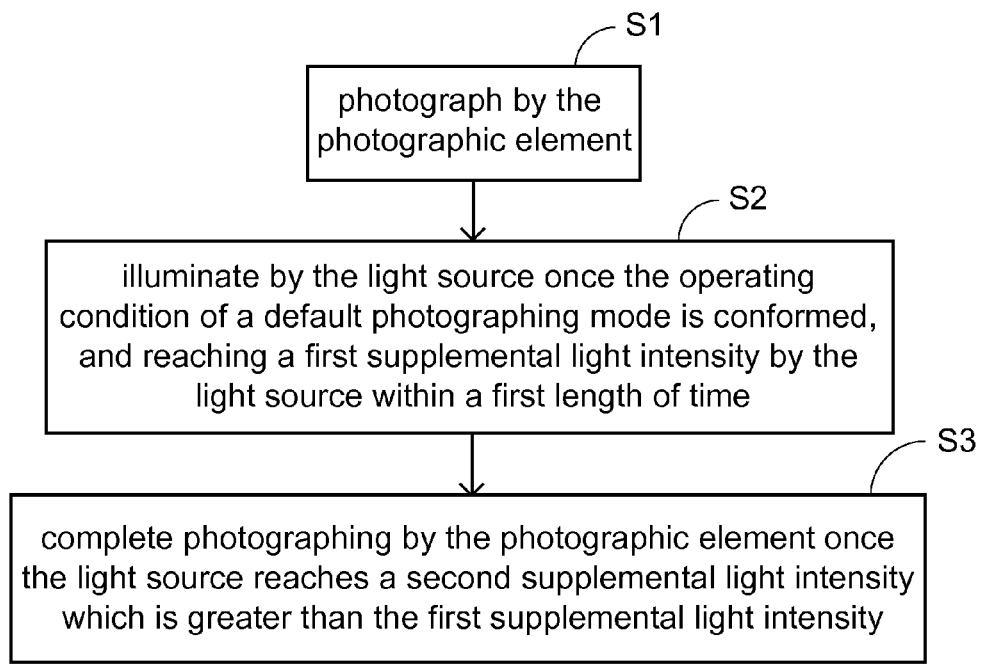
FIG. 3 is a flowchart of a supplemental light adjusting method according to an exemplary embodiment of the invention.

Referring to FIG. 3, a flowchart of a supplemental light adjusting method according to an exemplary embodiment of the invention is shown. As indicated in FIG. 3, the supplemental light adjusting method mainly comprises following steps. Firstly, the photographic element 10 photographs (step S1). Next, the light source 11 illuminates and reaches a first supplemental light intensity within a first length of time once the operating condition of a default photographing mode is conformed (step S2). Then, the photographic element 10 completes photographing after the light source 11 reaches a second supplemental light intensity which is greater than the first supplemental light intensity (step S3).

As disclosed above, the determination regarding the conformity of the operating condition of the default photographing mode comprises many scenarios exemplified below with corresponding operations.

For example, the user can use the photographic element 10 take a selfie. That is, the user holds the photographic apparatus 100 at hand to take a selfie without using a tripod. In terms of current technologies, the processing unit 14 can determine whether the current scenario is conformed to selfie photographing (that is, the default photographing mode) according to the analysis using specific image processing technology. In greater details, selfie photographing is a short distance photographing which does not photograph too many facial images. Therefore, the processing unit 14 can determine selfie photographing by way of facial recognition, and the number of recognized facial images is not greater than a default number (such as between 2~3) or the facial image has an area not smaller than a default size with respect to a screen display range.

Since selfie photographing is a short distance photographing, the processing unit 14 can determine the focusing position or distance of a target object (that is, the user) by using the photographic element 10, wherein the focusing position or distance is within a default length range. In greater details, the default length range can be designed according to an ordinary people's arm length. When the photographic element 10 performs auto focusing, the processing unit 14 compares the measured distance with the default length range. If the measured distance is smaller than the default length range, the processing unit 14 determines that the operating condition of selfie photographing (that is, the default photographing mode) is conformed.

Figure 4A:
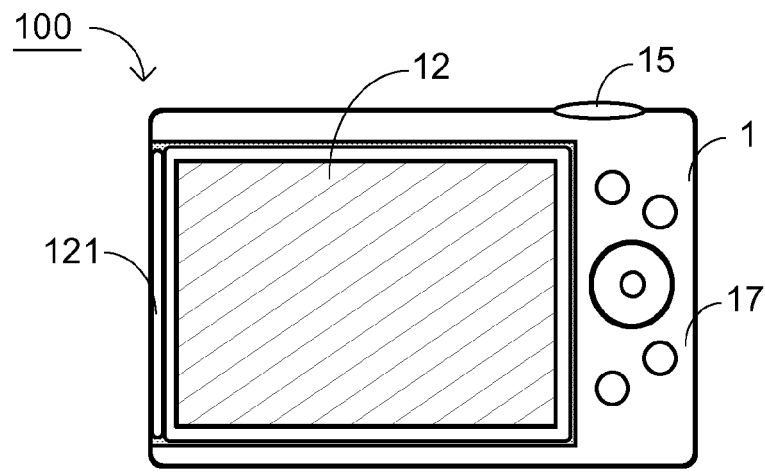
FIGS. 4A and 4B are schematic diagrams of a display unit 12 being at a first position and at a second position relative to a body 1.
Figure 4B:
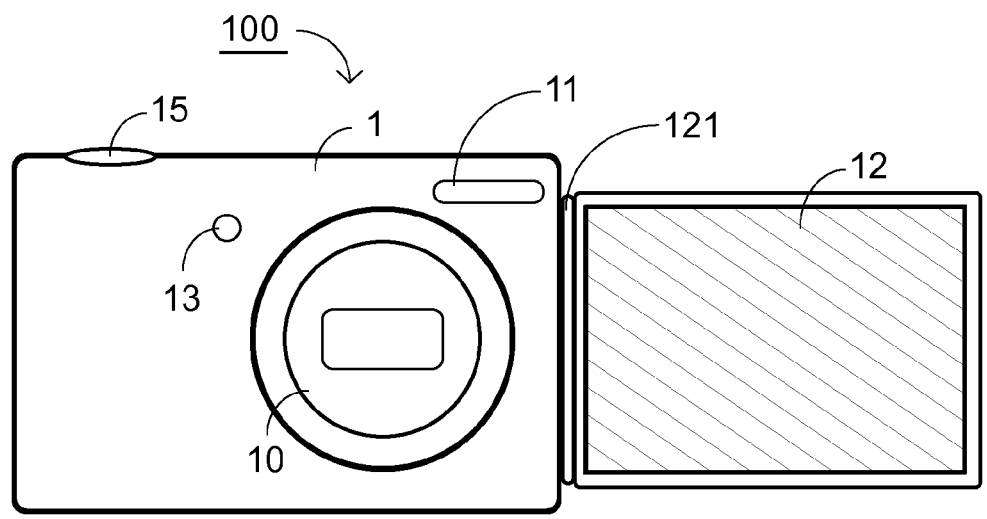

On the other hand, the conformity of selfie photographing can be determined according to the change in the state of the photographic apparatus 100. In greater details, the display unit 12 can rotate with respect to the body 1. Referring to FIGS. 4A and 4B, schematic diagrams of a display unit 12 being at a first position and at a second position relative to the body 1 are shown. As indicated in FIGS. 4A and 4B, the display unit 12 of the photographic apparatus 100 has a shaft 121 capable of rotating with respect to the body 1 so that the display unit 12 can be unfolded to face the same direction with the photographic element 10. For example, both the display unit 12 and the photographic element 10 face the user who is taking a selfie. Therefore, when the display unit 12 rotates to the second position of FIG. 4B from the first position of FIG. 4A with respect to the body 1, the operating condition of selfie photographing (that is, the default photographing mode) is regarded as being conformed. A rotation detection unit can further be designed in the body 1 to determine whether rotation occurs or not.

On the other hand, like night mode, character mode or indoor mode of generally known technologies, the default photographing mode can also be an in-built image scenery mode of the photographic apparatus 100 listed in a relevant function menu. When the user selects or activates this image scenery mode, the photographing is not limited to being used in selfie photographing and can also be used in ordinary photographing (that is, conformed to the operating condition of the default photographing mode). In terms of practical design, when the user selects or activates a function selection (can be implemented by a button or an icon) representing the supplemental light adjusting function, the user virtually selects or activates the disclosed image scenery mode, and this implies that the user wants to activate the supplemental light adjusting function of the invention.

In the abovementioned scenarios of determining whether the operating condition of the default photographing mode is conformed, the present embodiment further comprises a step of detecting an ambient light by the photo detection unit 13 to obtain a first ambient light intensity for accordingly determining whether to activate the supplemental light adjusting function. In greater details, the user needs illumination supplement only when the user is photographing in an environment lacking adequate ambient light or when the background is too dim. This first ambient light intensity obtained in the above step represents the ambient luminance detected without turning on the light source 11. That is, the background luminance of the current environment of the user. Therefore, the first ambient light intensity needs to be determined in the present embodiment, and it is determined that the operating condition of the default photographing mode is conformed (that is, selfie or ordinary photographing is accompanied with a dim environment) when the detected first ambient light intensity is smaller than a light intensity threshold.

In some embodiments, it can be designed that the supplemental light adjusting function is activated even when the ambient light is adequate. However, according to such design, the luminance of subsequent illumination supplement will be relatively decreased to reflect the background luminance of the current environment of the user.

Each possible scenario conforming to the operating condition of the default photographing mode can be known from the above disclosure. The present embodiment is featured in that when the operating condition of the default photographing mode is conformed, the light source 11 illuminates, that is, the supplemental light adjusting function is activated.

Figure 5:
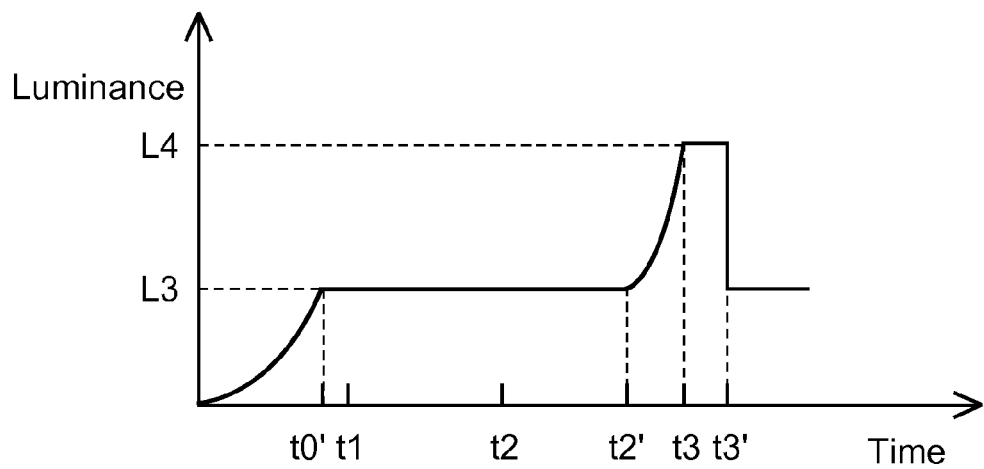
FIG. 5 is a diagram of luminance vs time relationship with the illumination of a light source 11 according to an exemplary embodiment.

Referring to FIG. 5, a diagram of luminance vs time relationship with the illumination of a light source 11 according to an exemplary embodiment is shown. Firstly, the light source 11 reaches a first supplemental light intensity L3 within a first length of time. In greater details, the first length of time is a range starting from time point 0 (that is, a time point at which the operating condition of the default photographing mode is determined as being conformed) and ending at time point t0', wherein the processing unit 14 determines the first supplemental light intensity L3 of the light source 11 in response to the detected first ambient light intensity. In other words, the light source 11 progressively increases the luminance within the first length of time. Since the first supplemental light intensity L3 is generated by the light source 11 with reference to the background luminance of the current environment, it would be easier for the photographed person's eyes to adapt to the supplemental light.

In the present embodiment, the luminance of the first supplemental light intensity L3 is relatively low. For example, the luminance of the first supplemental light intensity L3 is lower than the luminance required for completing photographing. The first supplemental light intensity L3 is generated to help the photographed person's eyes to adapt to the supplemental light and to assist the focusing of the photographic element 10. In the present embodiment, it is designed that the light source 11 reaches the first supplemental light intensity L3 within the first length of time with curve change, such that the photographed person's eyes can better adapt to the supplemental light.

In some embodiments, it can be designed that the first supplemental light intensity L3 is a fixed value. That is, a fixed and lower supplemental light intensity is generated without reference to the background luminance of the current environment.

In some embodiments, it is designed that the light source 11 reaches the first supplemental light intensity L3 within the first length of time with linear change.

As indicated in FIG. 5, the user does not completely press (that is, half press) the shutter button 15 at time point t1 such that the photographic element 10 performs focusing and metering, wherein time point t1 is latter than time point t0'. In some embodiments, time points t1 and t0' can be synchronized. Meanwhile, the photo detection unit 13 detects the ambient light to obtain a second ambient light intensity with the illumination of the first supplemental light intensity L3. Or, the second ambient light intensity is equivalent or close to the first supplemental light intensity L3. Next, the light source 11 maintains the luminance at the first supplemental light intensity L3, and the user completely presses (that is, full press) the shutter button 15 at time point t2 such that the processing unit 14 determines the second supplemental light intensity L4 of the light source 11 in response to the second ambient light intensity. The second supplemental light intensity L4 is greater than the first supplemental light intensity L3.

In the present embodiment, the processing unit 14 determines the second supplemental light intensity L4 within a length of time starting from time point t2 and ending at time point t2'. Moreover, the light source 11 is adjusted to the second supplemental light intensity L4 from the first supplemental light intensity L3 with curve change within a second length of time. In greater details, the second length of time is a range starting from time point t2' (that is, the time point at which the processing unit 14 completes calculation) and ending at time point t3. The processing unit 14 calculates the second supplemental light intensity L4 by comparing the first supplemental light intensity L3 with a default face luminance (target value) and then adding the result of comparison (for example, the first supplemental light intensity L3 is divided or subtracted by the default face luminance) to the first supplemental light intensity L3.

However, the calculation of the second supplemental light intensity L4 is not limited to the above exemplification.

Similarly, the luminance of the light source 11 is progressively increased to the second supplemental light intensity L4 from the first supplemental light intensity L3 (the eyes are preliminarily adapted to the supplemental light at the first supplemental light intensity L3) within the second length of time such that the photographed person's eyes can better adapt to the supplemental light. The photographic element 10 completes photographing after the light source 11 reaches the second supplemental light intensity L4. Since the second supplemental light intensity L4 is obtained through suitable calculation, a suitable supplemental light intensity can be determined so as to obtain better photographing results. In greater details, the second supplemental light intensity L4 lasts for a third length of time. In the present embodiment, the third length of time is a range starting from time point t3 (that is, the time point at which the light source 11 reaches the second supplemental light intensity L4) and ending at time point t3'. Therefore, the third length of time is the light capturing time that the photographic element 10 requires for photographing. Moreover, the third length of time can be the exposure time or corresponds to the speed of the shutter.

In some embodiments, it can be designed that the second supplemental light intensity L4 is a fixed value. That is, the second supplemental light intensity L4 can be set to be a fixed and higher supplemental light intensity and can be obtained without the calculation of the processing unit 14.

In some embodiments, it can be designed that the light source 11 is adjusted to the second supplemental light intensity L4 from the first supplemental light intensity L3 with discontinuous change within the second length of time. Variations and corresponding implementations of the said embodiment are disclosed below.

Figure 6:
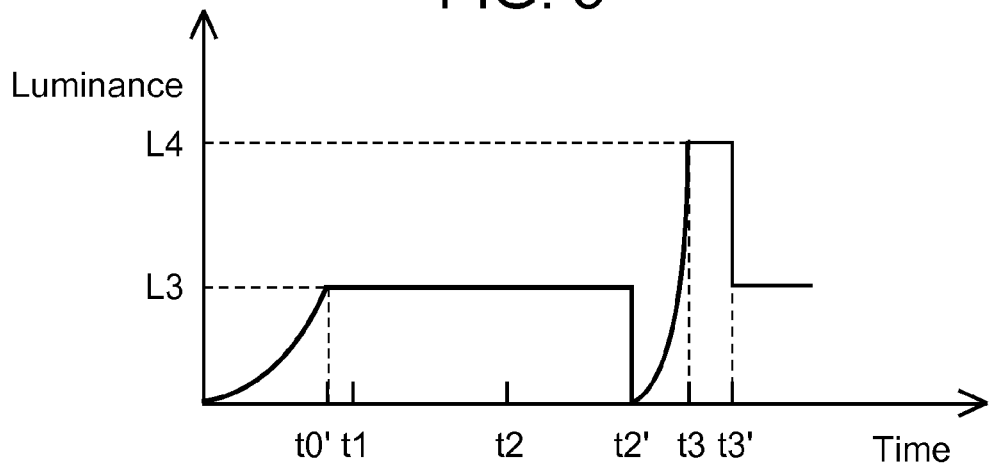
FIG. 6 is a diagram of luminance vs time relationship with the illumination of a light source 11 according to a variation of the exemplary embodiment.

Referring to FIG. 6, a diagram of luminance vs time relationship with the illumination of the light source 11 according to a variation of the exemplary embodiment is shown. FIG. 6 is different from FIG. 5 in that after the processing unit 14 completes calculation at time point t2', the luminance of the light source 11 immediately drops to 0 from the first supplemental light intensity L3, and then is adjusted to the second supplemental light intensity L4 from 0. In other words, the light source 11 is adjusted to the second supplemental light intensity L4 from the first supplemental light intensity L3 with discontinuous change within the second length of time (starting from time point t2' and ending at time point t3). This variation of embodiment is provided for those digital cameras or photographic apparatuses whose hardware conditions of flash lights or light sources cannot achieve the two-stage illumination supplement with continuous enhancement or adjustment indicated in FIG. 5, and can only adopt the discontinuous adjustment indicated in FIG. 6 instead. Since the second length of time is very short, human eyes can hardly detect the discontinuous change.

Figure 7:
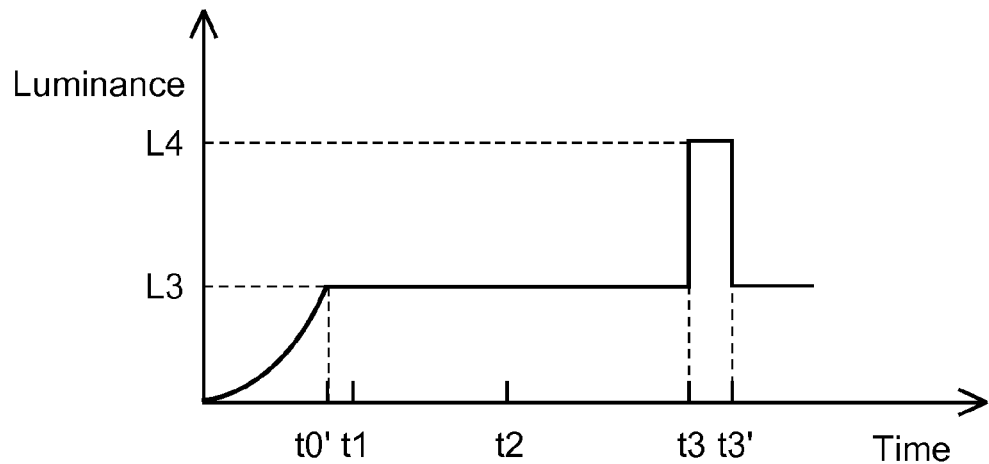
FIG. 7 is a diagram of luminance vs time relationship with the illumination of a light source 11 according to another variation of the exemplary embodiment.

Referring to FIG. 7, a diagram of luminance vs time relationship with the illumination of the light source 11 according to another variation of the exemplary embodiment is shown. FIG. 7 is different from FIG. 5 in that after the processing unit 14 completes calculation (that is, at time point t3 or any time point between time point t2 and time point t3), the luminance of the light source 11 directly jumps to the second supplemental light intensity L4 from the first supplemental light intensity L3 with discontinuous change. In other words, the second length of time within which the light source 11 adjusts its luminance is very short or near 0. That is, at time point t3, the luminance is adjusted to the second supplemental light intensity L4 from the first supplemental light intensity L3. Similarly, when the photographic apparatus cannot adopt the adjustment indicated in FIG. 5 due to the performance of hardware elements, the photographic apparatus can adopt the discontinuous adjustment indicated in FIG. 7 instead.

To summarize, in comparison to the turn-on mode of conventional flash light, the photographic apparatus with supplemental light adjusting function of the invention and supplemental light adjusting method used in the same adopt two-stage illumination supplement, enhancement or adjustment such that the photographed person's eyes can better adapt to the supplement light, and the dazzling problem, which arises when a conventional flash light has instant jump in high luminance or flickers, can thus be resolved. Meanwhile, the design of the invention is beneficial to illumination supplement in short distance photographing (such as the selfie photographing). Apart from avoiding the dazzling problem which easily occurs during short distance photographing, the invention further determines suitable supplemental light intensity according to the background luminance of the current environment so as to produce better photographing results. That is, the invention also avoids the luminance of the conventional flash light becoming too large and making the image too white.

Therefore, the invention effectively resolves relevant problems encountered in prior art and successfully achieves the main objects disclosed above.

While the invention has been described by way of example and in terms of the preferred embodiment (s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A photographic apparatus with supplemental light adjusting function, comprising:
   a body;
   a light source disposed on the body, wherein the light source is used for illumination and adjustable between a first supplemental light intensity and a second supplemental light intensity greater than the first supplemental light intensity; and
   a photographic element disposed on the body, wherein the photographic element is used for photographing;
   wherein once the operating condition of a default photographing mode is conformed, the light source reaches the first supplemental light intensity within a first length of time, and once the light source reaches the second supplemental light intensity, the photographic element completes photographing;
   wherein the photographic apparatus further comprises:
   a display unit rotatably disposed on the body for displaying the photographing state of the photographic element;
   wherein the operating condition of the default photographing mode is determining a position state of the display unit, and the display unit rotates to a second position from a first position with respect to the body.

2. A photographic apparatus with supplemental light adjusting function, comprising:
   a body;
   a light source disposed on the body, wherein the light source is used for illumination and adjustable between a first supplemental light intensity and a second supplemental light intensity greater than the first supplemental light intensity; and
   a photographic element disposed on the body, wherein the photographic element is used for photographing;
   wherein once the operating condition of a default photographing mode is conformed, the light source reaches the first supplemental light intensity within a first length of time, and once the light source reaches the second supplemental light intensity, the photographic element completes photographing;
   wherein the photographic apparatus further comprises:
   a photo detection unit used for detecting an ambient light;
   a processing unit; and
   a shutter button, wherein when the shutter button is not completely pressed, the photo detection unit detects an ambient light to obtain a second ambient light intensity under the illumination of the first supplemental light intensity, and when the shutter button is completely pressed, the processing unit, in response to the second ambient light intensity, determines the second supplemental light intensity with which the light source illuminates.

3. A photographic apparatus with supplemental light adjusting function, comprising:
   a body;
   a light source disposed on the body, wherein the light source is used for illumination and adjustable between a first supplemental light intensity and a second supplemental light intensity greater than the first supplemental light intensity; and
   a photographic element disposed on the body, wherein the photographic element is used for photographing;
   wherein once the operating condition of a default photographing mode is conformed, the light source reaches the first supplemental light intensity within a first length of time, and once the light source reaches the second supplemental light intensity, the photographic element completes photographing;
   wherein the light source reaches the first supplemental light intensity with linear change or curve change within the first length of time, or the light source is adjusted to the second supplemental light intensity from the first supplemental light intensity with curve change or discontinuous change within a second length of time.

4. A photographic apparatus with supplemental light adjusting function, comprising:
   a body;
   a light source disposed on the body, wherein the light source is used for illumination and adjustable between a first supplemental light intensity and a second supplemental light intensity greater than the first supplemental light intensity; and
   a photographic element disposed on the body, wherein the photographic element is used for photographing;
   wherein once the operating condition of a default photographing mode is conformed, the light source reaches the first supplemental light intensity within a first length of time, and once the light source reaches the second supplemental light intensity, the photographic element completes photographing;
   wherein the second supplemental light intensity lasts for a third length of time, which is an exposure time.

\* \* \* \* \*